United States Patent
Desai et al.

(10) Patent No.: US 11,758,921 B2
(45) Date of Patent: Sep. 19, 2023

(54) METHOD OF PRODUCING FROZEN CONFECTION WITH PROTEIN AGGLOMERATION AND DELAYED SUCROSE ADDITION

(71) Applicant: SOCIETE DES PRODUITS NESTLE S.A., Vevey (CH)

(72) Inventors: Nilesh Desai, Bakersfield, CA (US); Stephen Gene Mark, Kihei, HI (US); Madansinh Nathusinh Vaghela, Macedonia, OH (US); Rajiv Indravadan Dave, Bakersfield, CA (US); Nirav Chandrakant Pandya, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 630 days.

(21) Appl. No.: 16/754,163

(22) PCT Filed: Oct. 11, 2018

(86) PCT No.: PCT/EP2018/077761
§ 371 (c)(1),
(2) Date: Apr. 7, 2020

(87) PCT Pub. No.: WO2019/072979
PCT Pub. Date: Apr. 18, 2019

(65) Prior Publication Data
US 2021/0195916 A1  Jul. 1, 2021

Related U.S. Application Data

(60) Provisional application No. 62/572,090, filed on Oct. 13, 2017.

(51) Int. Cl.
*A23G 9/38* (2006.01)
*A23G 9/04* (2006.01)
(Continued)

(52) U.S. Cl.
CPC .......... *A23G 9/38* (2013.01); *A23G 9/04* (2013.01); *A23G 9/34* (2013.01); *A23G 9/46* (2013.01)

(58) Field of Classification Search
None
See application file for complete search history.

(56) References Cited

U.S. PATENT DOCUMENTS

| | | | | |
|---|---|---|---|---|
| 6,113,969 A * | 9/2000 | Bodor | ............... | A23L 29/238 |
| | | | | 426/589 |
| 2013/0122176 A1* | 5/2013 | Ummadi | ............... | A23G 9/38 |
| | | | | 426/474 |

FOREIGN PATENT DOCUMENTS

| CN | 104768389 A | 7/2015 |
|---|---|---|
| WO | 2010092091 | 8/2010 |

(Continued)

OTHER PUBLICATIONS

Chinese Office Action for Appl No. 201880066652.1 dated Nov. 3, 2022.

*Primary Examiner* — Jenna A Watts
(74) *Attorney, Agent, or Firm* — K&L Gates LLP

(57) ABSTRACT

The invention relates to a method of producing a frozen confection product, the method comprising the steps of: providing an ingredient mix free from added sugar or comprises below 0.2% wt, the composition comprising 3-17 wt. % fat, 3-17 wt. % milk solids non-fat, and 1-10 wt. % protein comprising casein and whey, the ingredient mix having a pH of 6.1-6.4; homogenising the ingredient mix and subsequently pasteurizing the composition at a temperature of 80°-100° C. for a period of 0.5-3 min to form agglomerated protein comprising casein and whey, adding 3-25 wt. % of sugar to the ingredient mix; and freezing while (Continued)

optionally aerating the ingredient mix, to form a frozen confection product. The invention also relates to a product obtained with the method.

20 Claims, 5 Drawing Sheets

(51) Int. Cl.
*A23G 9/34* (2006.01)
*A23G 9/46* (2006.01)

(56) References Cited

FOREIGN PATENT DOCUMENTS

| WO | 2012016852 | 2/2012 |
| WO | 2012016853 | 2/2012 |
| WO | 2012016854 | 2/2012 |
| WO | 2014067791 | 5/2014 |

* cited by examiner

METHOD OF PRODUCING FROZEN CONFECTION WITH PROTEIN AGGLOMERATION AND DELAYED SUCROSE ADDITION

CROSS REFERENCE TO RELATED APPLICATIONS

The present application is a National Stage of International Application No. PCT/EP2018/077761, filed on Oct. 11, 2018, which claims priority to U.S. Provisional Patent Application No. 62/572,090, filed on Oct. 13, 2017, the entire contents of which are being incorporated herein by reference.

FIELD OF THE INVENTION

The present invention relates to a method of producing frozen confection comprising agglomerated proteins. The invention also relates to frozen confection comprising agglomerated proteins obtained with the method.

BACKGROUND

It is known how to provide texture and mouthfeel to frozen confection by protein agglomeration through direct or indirect acidification. However, there continues to be a need for frozen confection exhibiting nutritional balance of macronutrients while delivering great taste and texture.

U.S. Pat. No. 8,936,821 discloses a method of producing an aerated frozen confection product, comprising the steps of subjecting an ingredient mix with a pH comprised between 5.8 and 6.3 to homogenising and pasteurising for specific time and temperature periods to form an agglomerated protein system, and then freezing the mix into products. The method provides a controlled agglomeration of the proteins. Although the method has many advantages in terms of improved texture and viscosity of the product, it was found that for non-stabilized/clean label and high fat formulations, sour aftertaste from acidification required for adjusting pH, limits its application. Further, non-stabilized or minimally stabilized formulations are very susceptible to heat shock instability and may lead to icy products.

Commercially available frozen yoghurt is generally manufactured with a process comprising two streams: a fermented mix stream and a non-fermented mix stream. Lower solids (~10 to 20%) is present in the fermented stream due to growth limitations of yogurt culture microorganisms while the non-fermented mix stream contains the remainder of higher amount of solids (~40 to 50%) than fermented mix stream.

However, only small part of dairy protein goes through coagulation process: Dairy protein in the non-fermented stream does not go through pH modification process before pasteurization and due to low amount of fermented portion used in final product (~8-15%), final pH is not enough to cause modification without any further heat treatment.

In the method for making the frozen yoghurt the method differs from controlled agglomeration as discussed in relation to the present invention. The fermented part in the frozen yoghurt method is generally near the isoelectric point of Casein, which causes complete coagulation compared to controlled agglomeration disclosed in U.S. Pat. No. 8,936,821.

The prior art does not show how to provide frozen confection delivering desirable taste and texture when the formulation is non-stabilized or minimally stabilized, and fat content in the product is high e.g. in the range of 10 to 17 wt. % fat.

Thus, there is a need for frozen confection, which exhibits nutritional balance of macronutrients while delivering great taste and texture.

OBJECT OF THE INVENTION

It is thus the object of present invention to provide frozen confection with improved texture, mouthfeel without off tastes and heat shock stability to prevent iciness in the product during distribution.

SUMMARY OF THE INVENTION

The present invention provides the improvement of protein agglomeration by separating the sucrose addition in the frozen confection manufacturing process.

In a first aspect, the invention relates to a method of producing frozen confection product, the method comprising the steps of:
providing an ingredient mix free from added sugar or comprises below 0.2 wt. sugar, the ingredient mix comprising
3-17 wt. % fat,
3-17 wt. % milk solids non-fat, and
1-10 wt. % protein comprising casein and whey,
the ingredient mix having a pH of 6.1-6.4
homogenising the ingredient mix and subsequently
pasteurizing the ingredient mix at a temperature of 80°-100° C. for a period of 0.5-3 min to form agglomerated protein comprising casein and whey,
adding 3-25 wt. % of sugar to the ingredient mix; and
freezing while optionally aerating the ingredient mix, to form a frozen confection product.

Without wishing to be bound by theory, it is believed that by separating and processing the sugar stream separately, it is possible to achieve controlled agglomeration of protein with lower level of acid (comparatively higher pH) as removal of shielding effect of sugars allowed the controlled protein agglomeration at lower level of added acid. Thus eliminating the issue of acid aftertaste in frozen confection products that are non-stabilized/clean label and high fat formulations.

The present invention uses milk protein-based agglomerates generated during heat treatment in presence of acids in order to deliver optimum sensorial properties while allowing reduction of the total fat content in the product. In addition, the described invention enables formulation of frozen confection without the use of additional stabilizers or hydrocolloids.

In a second aspect the invention relates to a frozen confection obtained by the above-described method.

DETAILED DESCRIPTION OF THE INVENTION

Figure 1:
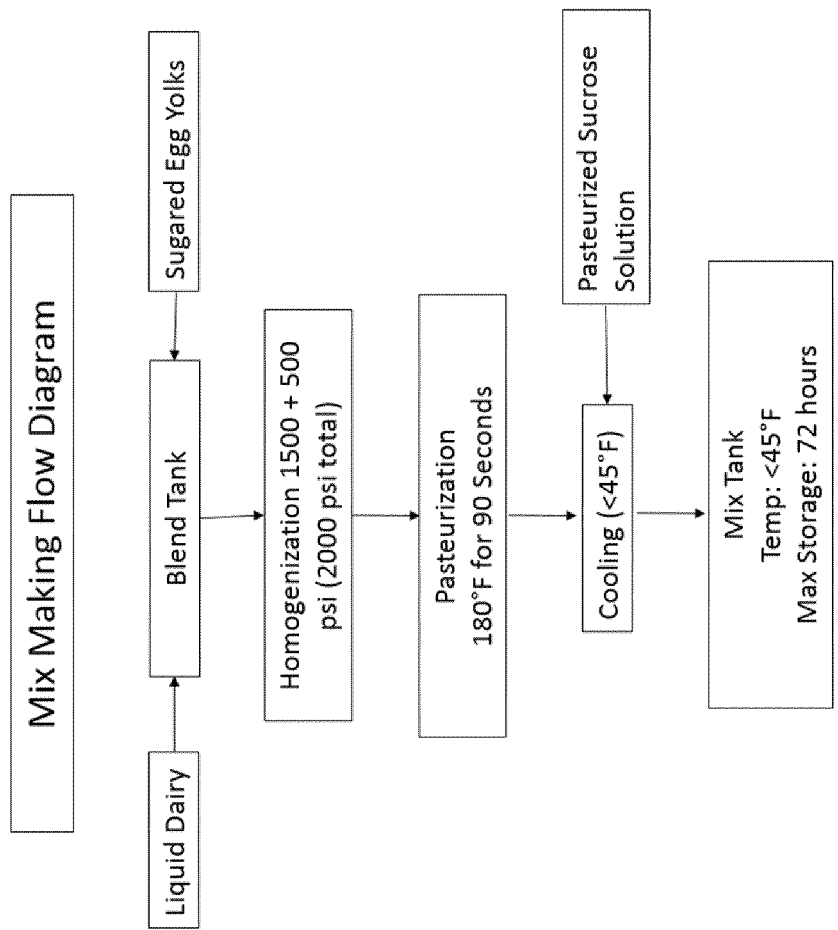
FIG. 1 shows a process diagram for delayed sucrose addition in an ice cream making process.

When carrying out experiments on separating sugar addition to the ingredient mix, it was surprisingly found that it is possible to achieve controlled agglomeration of protein with lower amount of acid. According to the invention, the composition is therefore substantially free of sugar or has such small amounts of sugar that the agglomeration of the proteins is not affected. According to the invention, the ingredient mix prior may comprise 0.2% wt, preferably below 0.15% sugar, prior to the pasteurization.

In these conditions, the heat treatment of proteins is leading to a controlled agglomeration of the proteins, which was shown to positively affect the textural and sensorial properties of the finished products.

A major advantage of this invention is that it improves texture of protein-based systems and enables a reduction or elimination of the use of additional hydrocolloids and/or emulsifiers.

In the present context the agglomerates created with the method according to the invention and present in the product of the invention have a size of 10-40 microns as measured by $D_{(4,3)}$ mean diameter. The agglomerate particle size distribution is measured (PSD) using a laser granulometer such as a Mastersizer 2000 (Malvern Instruments, UK). For the measurements, a sample may be dispersed in the Hydro SM measuring cell until an obscuration rate of 9-10% is obtained and then analysed in the Mastersizer.

In a preferred embodiment of the invention, the majority of agglomerates are less than 60 microns, preferably 10-40 microns, more preferably 10-30 microns. This gives a desirable mouth feel to the product without the agglomerates providing grittiness.

It is also preferred that the ingredient mix comprises the casein to whey protein in a ratio of 90/10-60/40. This has the advantage of providing preferred limiting levels of whey proteins in its natural state and is important for forming enough controlled agglomeration with casein micelles.

Further, in the present context unless otherwise indicated % of a component means the % of weight based on the weight of the ingredient mix, i.e. weight/weight %.

In addition by "frozen confection" is meant product such as ice cream, sorbet, mellorine, milk shake, any frozen dessert etc.

Preferably the pH of the ingredient mix is 6.1-6.25, preferably 6.15-6.25, when measured at room temperate (25° C.). It has been found at this mild level of acidification, no off taste was present in the product while this pH range still allows controlled agglomeration of the proteins due to acid and heat treatment.

The acidifier used in the method according to the invention can be an acidic fruit juice, an acidic fruit puree, coffee concentrate, non-alkalized cocoa, citric acid, brown sugar, molasses, dried sugar can extract, lactic acid, malic acid or ascorbic acid. The preferred acidifier is a lemon juice concentrate.

In the method according to the invention sugar is added after the pasteurization of the ingredient mix. To ease the processing of the ingredient mix the sugar may be added in the form of a solution. According to the invention, the sugar is preferably in the form of a solution is pasteurized to make the product safe and avoid contamination.

In accordance with the invention, the pH of the ingredient mix is typically 6.4 or higher before adding the acidifier.

In a preferred embodiment of the method of the invention, 5-20 wt. %, preferably 10-15 wt. % of sugar is added to the ingredient mix after the pasteurization.

Advantageously, sugar added after the pasteurization is pasteurized sugar, preferably in the form of a solution comprises 20-80 wt. %, preferably 50-70 wt. % sugar.

In the present context the term "sugars" in this document will be defined as a mixture of mono- and di-saccharides.

For example, sucrose, glucose, fructose, maltose are sugars according to this definition. Sugars may also include low caloric mono- and di-saccharides, sugar alcohols, natural and/or artificial intense sweeteners. Moreover, the term "sugar" will be defined as sucrose, or common sugar.

The sugar is preferably selected from the group consisting of sucrose, dextrose, maltose, glucose or a combination thereof.

The sugar may advantageously be in the form of syrup e.g. corn or cereal syrup or glucose syrup. Sugar could also be added in the form of powder, crystalline or granular form The method according to the invention is particularly useful for high fat products. More particularly for product which is made without stabilizers or hydrocolloids. Preferred ingredient mixes comprises 5-17 wt. %, preferably 10-17 wt. % fat.

The ingredient mix used in the method according to the invention comprises 1-10 wt. % protein comprising casein and whey. Preferably, the ingredient mix comprises 3-7 wt. %, preferably 3-5 wt. % protein. Protein levels higher than 10% may cause processing challenges due to high viscosity, and may adversely affect sensory properties of finished product. Furthermore, too much protein interaction will lead to complete coagulation and cannot be processed normally. At proteins level below 1%, there would not be enough protein to obtain a benefit of the method according to the invention.

The caseins and whey proteins in the ingredient mix are preferably provided in a form selected from the group consisting of raw milk, pasteurized milk, low heat concentrated milk, low heat milk powder, milk protein concentrate, milk protein isolate, lactose-reduced milk solids not fat in liquid or powder format or a combination thereof while the additional whey proteins are provided in a form selected from the group consisting of sweet dairy whey, whey protein concentrates, whey protein isolates in liquid, concentrate or powder format or a combination thereof.

The ingredient mix used in the method of the invention preferably comprises at least one emulsifier, preferably at least one natural emulsifier.

Natural emulsifiers include for example egg yolk, buttermilk, raw or processed acacia gum, lecithin (soy, sunflower, safflower or other plant derived lecithin), natural plant extracts, rice bran extract or mixtures thereof. The natural emulsifiers have the advantage of conferring to the finished product a smoother texture and stiffer body which reduce the whipping time. The presence of natural emulsifiers results in air cells that are smaller and more evenly distributed throughout the internal structure of the ice cream. Preferably, the natural emulsifier used in the ingredient mix is egg yolk.

The ingredient may comprises 0.5-1.4% egg yolk solids, which preferably comprises about 10% sugar for stabilization.

According to a specific embodiment of ingredient mix it consist essentially of natural ingredients. Therefore, the ingredient mix does not include any artificial or non-natural emulsifier or stabiliser.

By "natural ingredients" what is meant ingredients of natural origin. These include ingredients which come directly from the field, animals, etc. or which are the result of a physical or microbiological/enzymatic transformation processes only. These therefore do not include ingredients, which are the result of a chemical modification process.

Examples of non-natural ingredients which are avoided in this particular embodiment of the invention include for example mono- and diglycerides of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acids, sucrose esters of fatty acids, polyglycerol esters of fatty acids, polyglycerol polyricinoleate, polyethylene sorbitan mono-oleate, polysorbate 80, chemically extracted lecithin.

Chemically modified starches, which are used in the art as stabilisers are also preferably avoided. These include for example oxidised starch, monostarch phosphate, distarch phosphate, phosphated or acetylated distarch phosphate, acetylated starch, acetylated distarch afipate, hydroxy propyl starch, hydroxypropyl distarch phosphate, acetylated oxidised starch.

The ingredient mix used in the method according to the invention is preferably essentially free of the preceding synthetic esters and modified starches. "Essentially free" means that these materials are not intentionally added for their conventional property imparting abilities, e.g. stabilizing, although there could be unintended minor amounts present without detracting from the performance of the products. Generally and preferably, the products of the invention will not contain any non-natural materials.

The ingredient mix may also be free of the above mentioned emulsifiers and comprise only egg yolk for emulsification.

The ingredient mix may comprises 0-3 wt. %, preferably 0.1-2% wt. % stabilizer.

The content of soluble protein in the ingredient mix is preferable below or equal to 30% in relation to the total protein content indicating that the majority of the proteins are in the form of agglomerates.

It has been found that the method according to the invention is particularly useful for making ice cream. In this embodiment of the invention the ingredient mix is a mix for frozen confection and comprises fat in an amount of 10-17 wt. %, and milk solids non-fat in an amount of 3-17 wt. %.

The ingredient mix may further comprises flavours, colourings, water, fruit and cocoa preparations and/or commonly used ice cream inclusion components.

For the making of frozen confection the ingredient mix may be frozen while optionally aerating the mix preferably to an overrun of at least 20%, preferably 30% to 120%, most preferably 30% to 40% or 100% and 120% to form an aerated frozen confection product, and optionally hardened.

In the making of frozen confection the product is optionally subjecting subject to a dynamic cooling at a temperature below −11° C. in a single or twin extruder.

FIG. 1 shows a process diagram for a preferred the method of producing frozen confection with delayed sucrose addition in the ice cream making process.

An ingredient mix of fat, milk solids not fat and protein is added in liquid dairy format to a blend tank where also sugared egg yolks are added. The ingredient mix is homogenized in a two stage homogenizer at 1500+500 psi respectively (2000 psi total).

In the method in FIG. 1, the ingredient mix is then pasteurized at 82.2° C. (180° F.) for 90 seconds. The ingredient mix is then cooled to a temperature below 7.2° C. (45° F.). A pasteurized sucrose solution is then added and the mix of the other ingredients in a mix tank. The ingredient mix is then stored at a temperature below 7.2° C. (45° F.) for up to 72 hours.

EXAMPLES

By way of example and not limitation, the following examples are illustrative of various embodiments of the present invention.

Example 1

Ice Cream with Milk Protein-Based Agglomerates Obtained by Light Acidification and Separate Sugar Addition.
Material and Methods
Samples:
Sample 1:
  Is a commercially available ice cream (control)
Sample 1—Composition—Variety 1
Fat 16 wt. %
Sugared Egg Yolks 1.2 wt. % (comprising 10% sucrose)
Milk Solids Non Fat 10 wt. %
Sucrose 15 wt. %
Total Solids 42.2 wt. %
Sample 2:
  Same composition as sample 1 but with pH reduced to 6.2 before pasteurization and sucrose addition was after pasteurization.
Sample 3:
  Same composition as sample 1 but with pH was reduced to 6.2 before pasteurization but sucrose added before pasteurization.
Sample 4: (Delayed Sucrose):
  The pH was 6.51 (Regular pH) but sucrose added after pasteurization.

All ingredient mixes have similar fat and solids ranges. The fat, MSNF and sugared egg yolk are mixed together. The sucrose is added to the mixes before the heat treatment or after as indicated above.

The processing of the mixes follows the flow diagram shown in FIG. 1.
Homogenization:
  All ingredient mixes are homogenized prior to the heat treatment.
Heat Treatment:
  All mixes were prepared in bench scale pasteurizer in pilot plant.

Heat treatment was 82.2° C.+/−2° (180° F.) for 90 seconds.

In the ingredient mixes for samples 2 and 3 the pH was adjusted with an acidifier being lemon juice concentrate to a pH of 6.15-6.2 after batching, but before pasteurization. The pH Level was decided by sensory impact (no after taste) of lemon juice concentrate. A trained sensory panel of 8 people tasted the products and did not find any acid after taste.

Before checking viscosity and particle size, all variables were cooled overnight at 4.4° C. (40° F.)

The samples with delayed sugar addition were measured after addition of liquid sucrose and cooling to refrigerated temperature.

The liquid sucrose was made from 68 wt % sucrose and the remaining water.

Viscosity measurements were done on the final mix prior to freezing. The viscosity measurement were done at 4.4° C. (40° F.)+/−3° using Brookfield LV viscometer with Spindle 1 @10 rpm, as described above.

The final ingredient mix was then aerated and frozen.

Results

Figure 2:
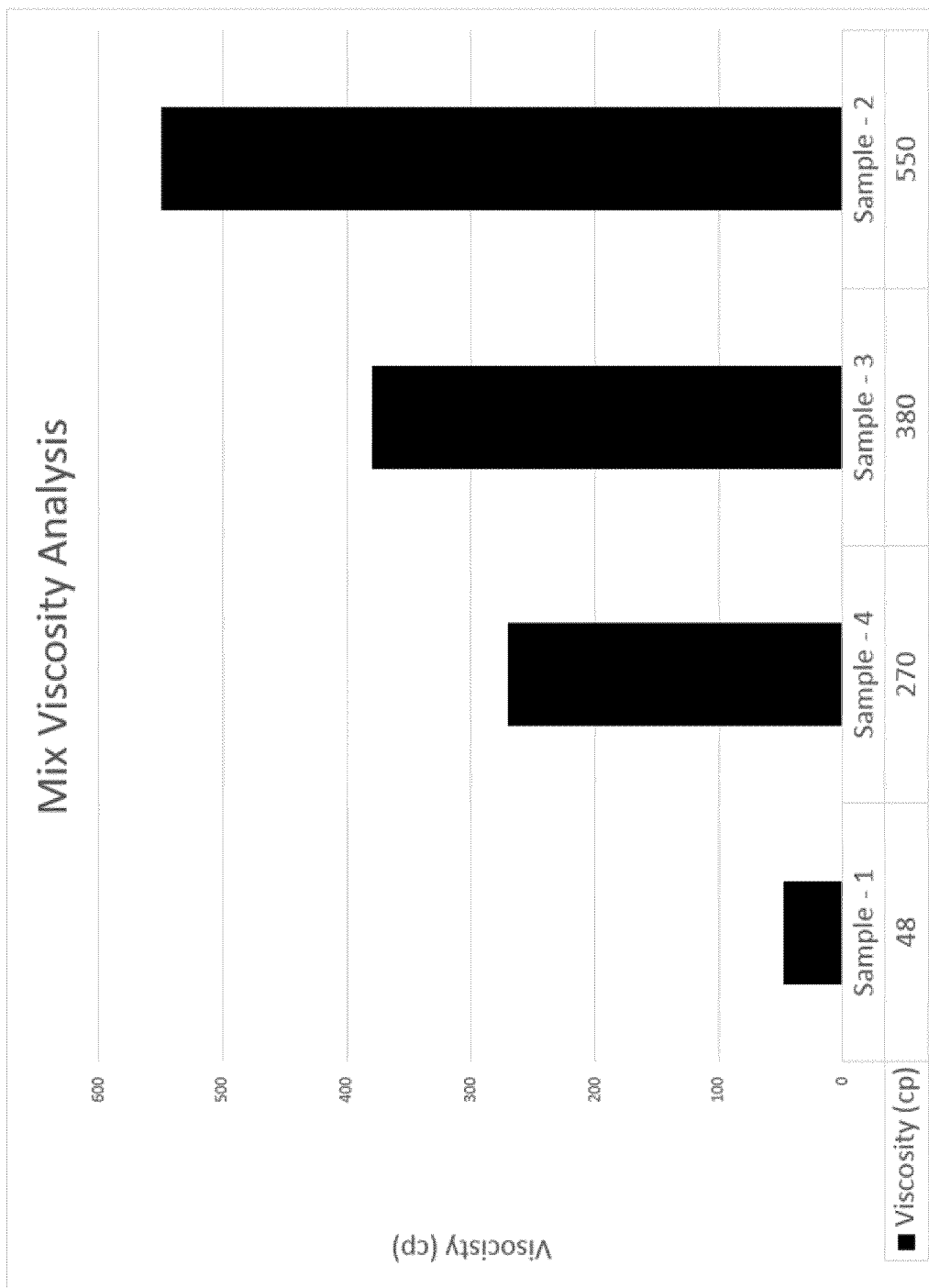
FIG. 2 shows the viscosity of a sample of according to the invention compared with the viscosity of acidified samples and a control.

Viscosity:

FIG. 2 shows the viscosity of a samples 1 to 4.

A viscosity increased was obtained in the samples with reduction in pH and delayed sucrose addition.

Further reduction in pH may result in higher viscosity but lemon juice concentrate flavor impact was observed at pH lower than 6.1. So, pH reduction was limited to 6.2.

The highest level of viscosity that was observed was when both reduction in pH and delayed sucrose addition used (Sample 2).

Figure 3:
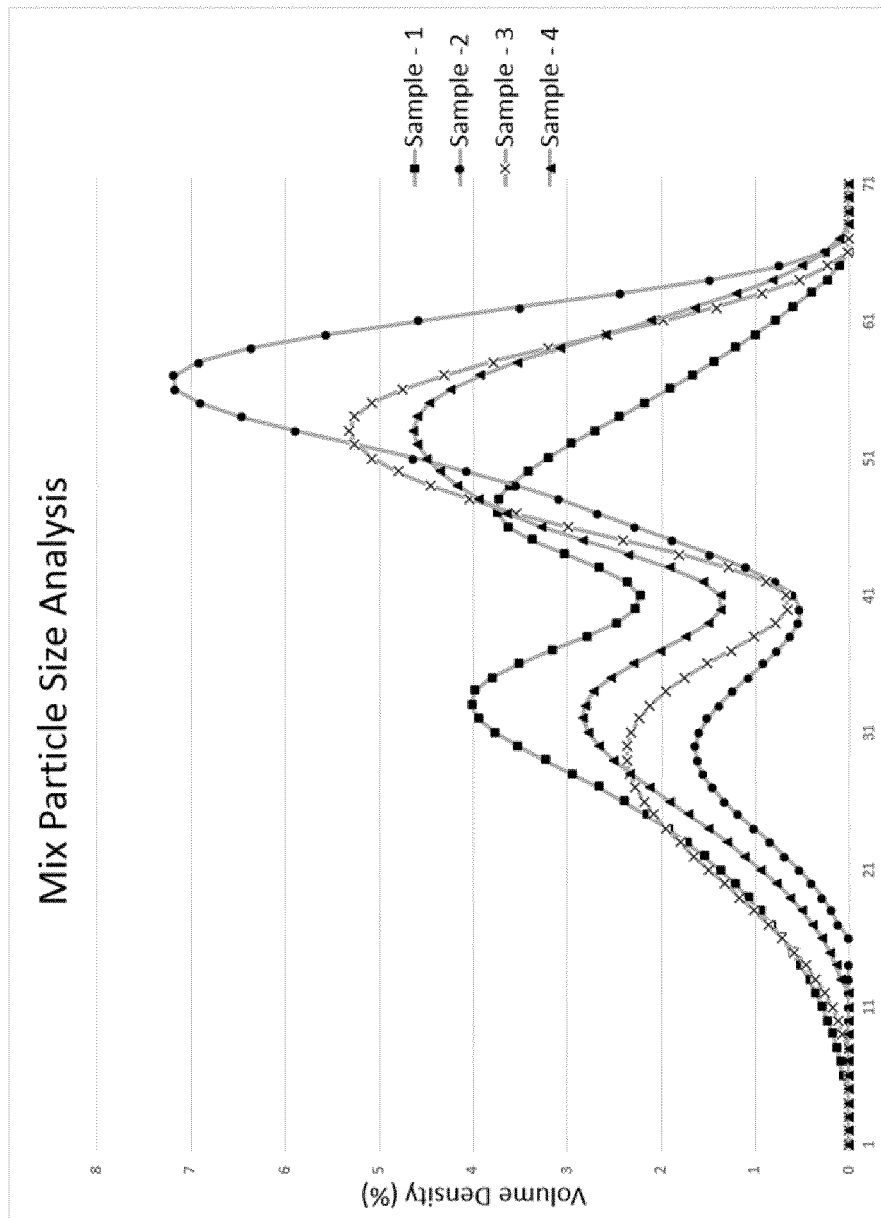
FIG. 3 shows particle size distribution of the samples in FIG. 2.

Particle Size:

A particle size analysis showed similar trend and increased with higher viscosity values as shown in FIG. 3.

It also shows that a higher viscosity was achieved when delayed sucrose and pH reduction were used at same time.

Example 2

Ice Cream with Milk Protein-Based Agglomerates Obtained by
Light Acidification and Separate Sugar Addition.
Material and Methods
Sample 5:
  Is a commercially available ice cream (control)
Sample 5—Composition of Variety 2
Fat 16 wt. %
Sugared Egg Yolks 1.2 wt. % (comprising 10% sucrose)
Milk Solids Non Fat 10 wt. %
Sucrose 15 wt. %
Total Solids 42.2 wt. %
Sample 6:
  Same composition as sample 5 but with pH reduced to 6.2 before pasteurization and sucrose addition was after pasteurization.
Sample 7:
  Same composition as sample 1 but with pH was reduced to 6.2 before pasteurization but sucrose added before pasteurization.

The samples were prepared as indicated in Example 1.

Results

Figure 4:
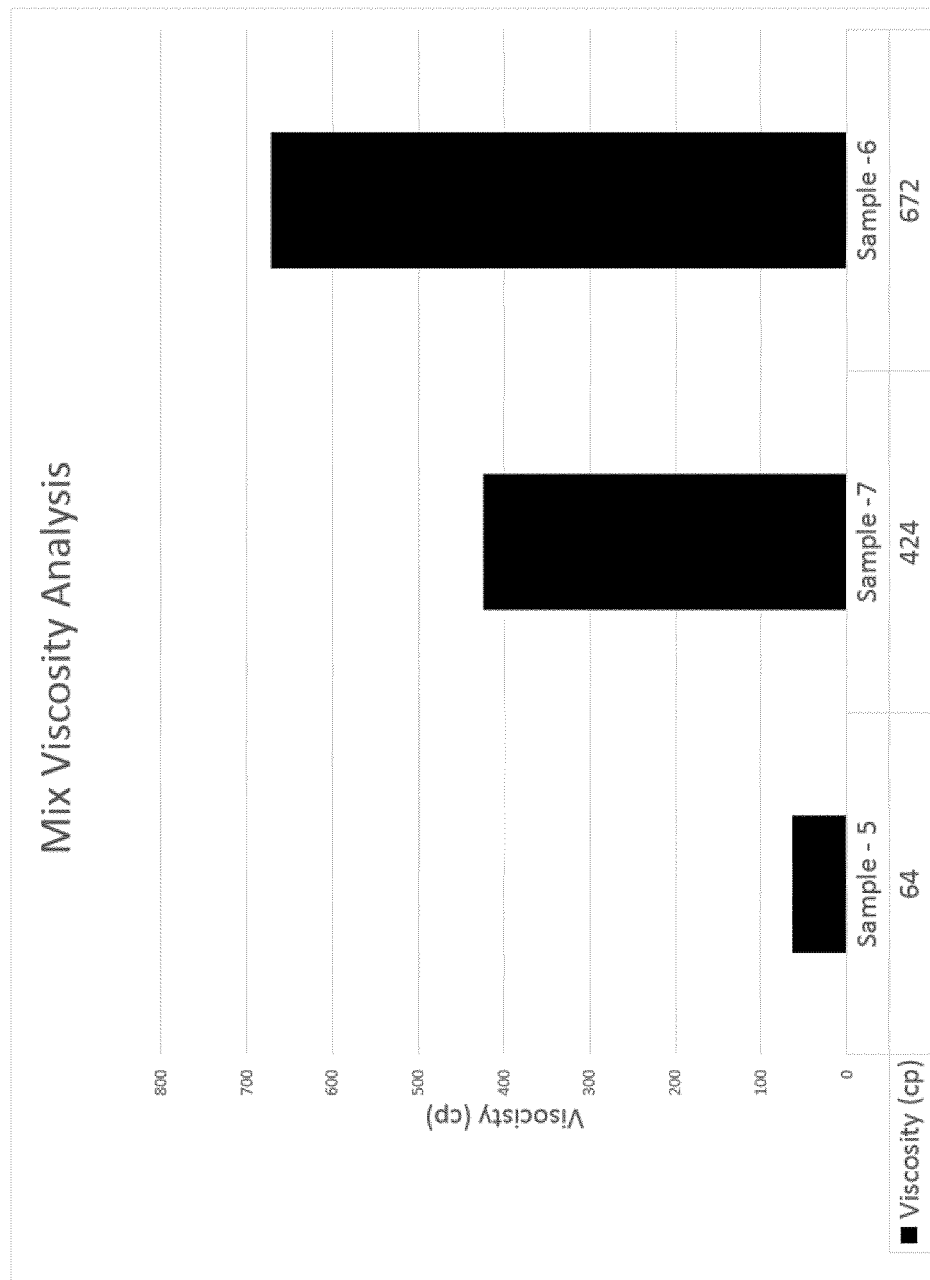
FIG. 4 shows the viscosity of a second sample of according to the invention compared with the viscosity of an acidified sample and a control.

Viscosity:

FIG. 4 shows the viscosity of a samples 5 to 6.

A viscosity increased was obtained in the samples with reduction in pH and delayed sucrose addition.

Further reduction in pH may result in higher viscosity but lemon juice concentrate flavor impact was observed at pH lower than 6.1. So, pH reduction was limited to 6.2 similarly to example 1.

The highest level of viscosity that was observed was when both reduction in pH and delayed sucrose addition used (Sample 6).

Figure 5:
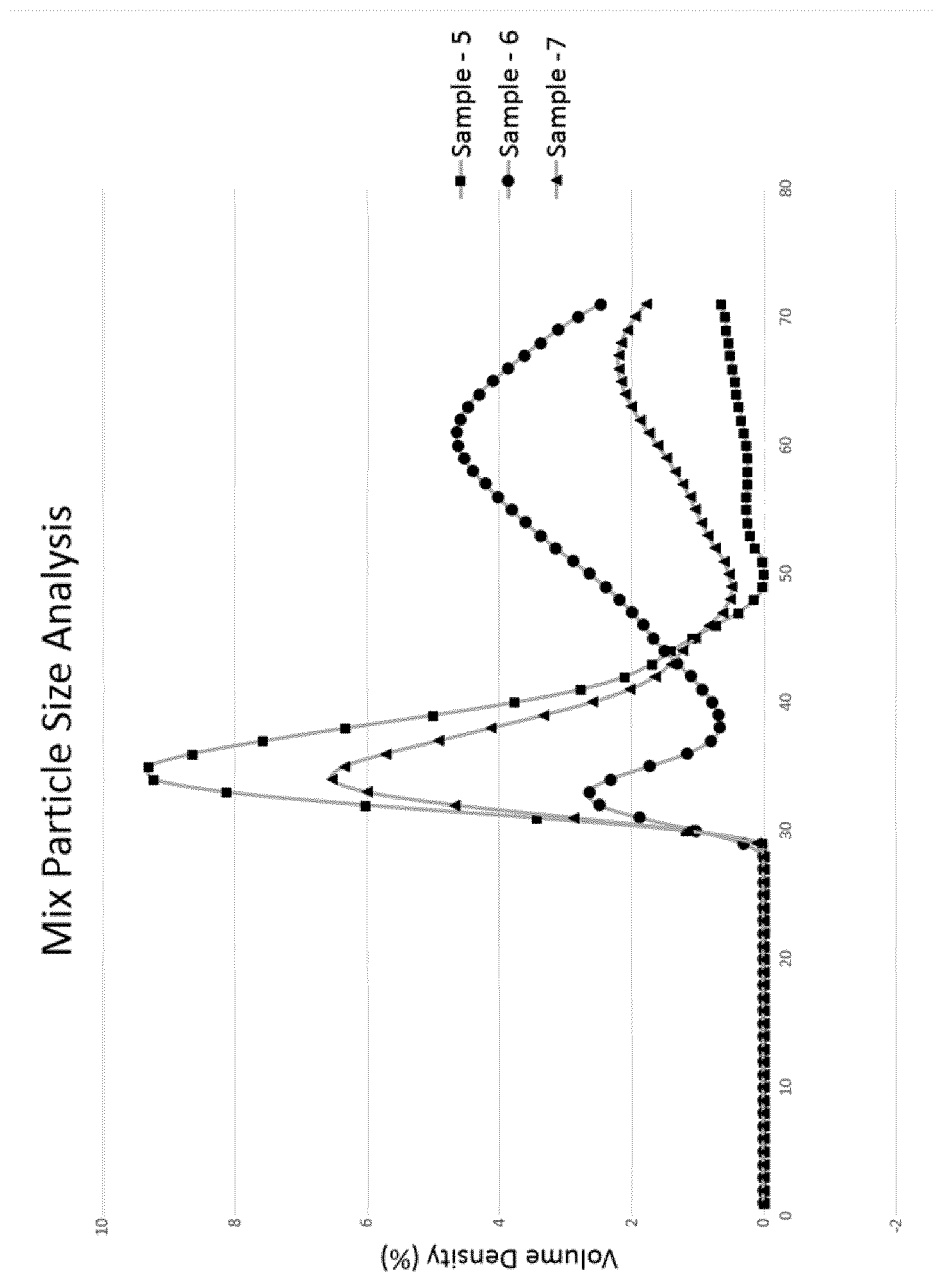
FIG. 5 shows particle size distribution of the samples in FIG. 4.

Particle Size:

A particle size analysis showed similar trend and increased with higher viscosity values as shown in FIG. 5.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of producing a frozen confection product, the method comprising the steps of:
   providing an ingredient mix comprising below 0.2 wt. % sugar, the ingredient mix comprising
   3-17 wt. % fat,
   3-17 wt. % milk solids non-fat, and
   1-10 wt. % protein comprising casein and whey,
   the ingredient mix having a pH of 6.1-6.4,
   homogenising the ingredient mix and subsequently
   pasteurizing the ingredient mix at a temperature of 80°-100° C. for a period of 0.5-3 min to form agglomerated protein comprising casein and whey,
   adding 3-25 wt. % of sugar to the ingredient mix after the pasteurizing; and
   freezing the ingredient mix, to form the frozen confection product.

2. The method according to claim 1, wherein the pH of the ingredient mix is 6.1-6.25.

3. The method according to claim 1, wherein 5-20 wt. % of sugar is added to the ingredient mix after the pasteurizing.

4. The method according to claim 1, wherein the sugar added after the pasteurizing is pasteurized sugar.

5. The method according to claim 1, wherein the ingredient mix comprises 5-15 wt. % fat.

6. The method according to claim 1, wherein the ingredient mix comprises 3-7 wt. % protein.

7. The method according to claim 1, wherein the sugar added to the ingredient mix after the pasteurizing is selected from the group consisting of sucrose, dextrose, maltose, glucose and combinations thereof.

8. The method according to claim 1, wherein the ingredient mix comprises egg yolk.

9. The method according to claim 1, wherein the protein agglomerates have a mean diameter of 10-40 microns.

10. The method according to claim 1, wherein the casein to the whey protein is in a ratio of 90/10-60/40.

11. The method according to claim 1, wherein the content of soluble protein in the ingredient mix is below or equal to 30% in relation to the total protein content.

12. The method according to claim 1, wherein the ingredient mix comprises 0-3 wt. % stabilizer.

13. The method according to claim 1, wherein the freezing of the ingredient mix is performed while aerating the mix to form an aerated frozen confection product, and optionally hardened.

14. The method according to claim 1, wherein the ingredient mix comprises 10-17 wt. % fat.

15. The method according to claim 1, wherein the ingredient mix further comprises an acidifier.

16. The method according to claim 15, wherein the acidifier is lemon juice concentrate.

17. The method according to claim 1, wherein the sugar added to the ingredient mix after the pasteurizing is in the form of a sugar solution.

18. The method according to claim 17 further comprising pasteurizing the sugar solution before adding the sugar solution to the ingredient mix.

19. The method of claim 1, wherein the frozen confection product is ice cream.

20. The method of claim 1, wherein the sugar added to the ingredient mix further comprises at least one ingredient selected from the group consisting of flavors, colorings, water, fruit, and cocoa.

\* \* \* \* \*